(No Model.)

E. LUNKENHEIMER.
GREASE CUP.

No. 410,423. Patented Sept. 3, 1889.

Witnesses:
W. C. Jirdinston.
Charles Billow

Inventor:
Edmund Lunkenheimer
by Peck & Rector
his Attorneys.

UNITED STATES PATENT OFFICE.

EDMUND LUNKENHEIMER, OF CINCINNATI, OHIO, ASSIGNOR TO THE LUNKENHEIMER BRASS MANUFACTURING COMPANY, OF SAME PLACE.

GREASE-CUP.

SPECIFICATION forming part of Letters Patent No. 410,423, dated September 3, 1889.

Application filed April 20, 1889. Serial No. 307,950. (No model.)

*To all whom it may concern:*

Be it known that I, EDMUND LUNKENHEIMER, a citizen of the United States, residing at Cincinnati, in the county of Hamilton and State of Ohio, have invented certain new and useful Improvements in Grease-Cups, of which the following is a full, clear, and exact description, reference being had to the accompanying drawings, forming part of this specification.

My invention relates to grease-cups for lubricating journals and bearings; and it has for its object the improved construction of such cups, whereby the packing may be expanded to prevent leakage.

The novelty of my invention will be herewith set forth, and specifically pointed out in the claim.

Figure 1:
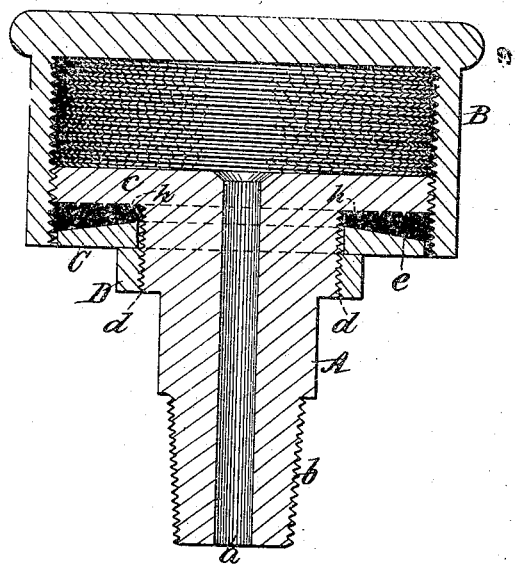
Figure 2:
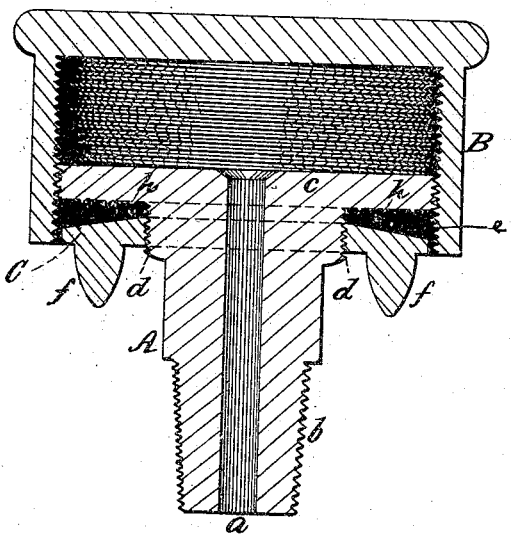

In the accompanying drawings, Figure 1 is a central sectional elevation of my improved cup under one form of construction. Fig. 2 is a corresponding view under another form of construction.

The same letters of reference are used to indicate identical parts in both the figures.

The metal base or standard A of the cup has a central bore *a* extending through it for the escape of the lubricant from the cup to the bearing or part to be lubricated, and it has its lower end exteriorly threaded, as at *b*, as a means of attaching it to the bearing or part to be lubricated. It has at its upper end a disk *c*, exteriorly threaded to be screwed into the interiorly-threaded metal cup B, which is a cylinder closed at its upper end, but open at its lower end to receive the disk *c*. That portion of the standard A just beneath the disk *c* is also exteriorly threaded, as at *d*, and receives upon this threaded portion the packing-ring *e*, of any suitable compressible material—as leather, for instance—which is confined between the under side of the disk *c* and the upper side of a washer C, which is fitted around the threaded portion *d* and is held and forced upward, as in Fig. 1, by a nut D, screwed upon the threaded portion *d* and bearing against the under side of the washer, or, as in Fig. 2, by securing the washer directly upon the threaded portion *d* and providing its under side with turning or spanner lugs *f*. The washer C is of just sufficient diameter to snugly fit within the cup B without coming in contact with the threads of said cup, and its upper side is made convex or beveled, as shown, so that by forcing it up the packing is pressed outward from the center and made to tightly fill the threads under the disk *c*, thereby preventing any leakage from the cup, as will be readily understood. As the packing becomes worn, the washer C may be forced up from time to time to re-expand the packing. The same advantage may be obtained by having the under side of the disk *c* convex or beveled and the upper side of the washer flat, or by having both bearing-surfaces against the packing convex or beveled, as will be readily understood. The under side of the disk *c* is roughened or provided with holding or retaining points, as seen at *h*, to engage with and prevent the turning of the packing while compressing it by the adjustment of the washer. The feeding of the lubricant is accomplished by screwing down the cup B upon the disk *c*.

Having thus fully described my invention, I claim—

The grease-cup herein described, consisting, essentially, of the interiorly-threaded cup B, the hollow standard or stem A, having the exteriorly-threaded disk *c*, the expansible packing *e*, and the adjustable screw-connected washer C, for forcing the expansible packing outward into the threads of the cup B, whereby to enable the screw-joint between the cup and the standard-disk to be kept tight without disturbing the relative positions of said parts and without disconnecting the cup as a whole, substantially as described.

EDMUND LUNKENHEIMER.

Witnesses:
CHAS. M. PECK,
CHARLES BILLON.